United States Patent
Nishida et al.

(10) Patent No.: US 8,462,801 B2
(45) Date of Patent: Jun. 11, 2013

(54) MOBILE COMMUNICATION METHOD, MOBILITY MANAGEMENT NODE, AND PACKET EXCHANGER

(75) Inventors: Katsutoshi Nishida, Ota-ku (JP); Keisuke Suzuki, Yokosuka (JP); Shin Naraha, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/501,361

(22) PCT Filed: Oct. 15, 2010

(86) PCT No.: PCT/JP2010/068208
§ 371 (c)(1),
(2), (4) Date: Jun. 27, 2012

(87) PCT Pub. No.: WO2011/046220
PCT Pub. Date: Apr. 21, 2011

(65) Prior Publication Data
US 2012/0263110 A1    Oct. 18, 2012

(30) Foreign Application Priority Data
Oct. 16, 2009   (JP) ................ 2009-239881

(51) Int. Cl.
*H04J 1/16* (2006.01)
*H04L 12/56* (2006.01)
(52) U.S. Cl.
USPC ............ 370/401; 370/252; 370/278; 370/329
(58) Field of Classification Search
USPC .................. 370/252, 278, 329, 401
See application file for complete search history.

(56) References Cited

U.S. PATENT DOCUMENTS
2009/0143090 A1*  6/2009  Mimura et al. ............... 455/518

FOREIGN PATENT DOCUMENTS
JP    2008-172294 A    7/2008

OTHER PUBLICATIONS

International Search Report issued in PCT/JP2010/068208 dated Nov. 16, 2010, with translation (2 pages).
3GPP TS 23.007 V9.1.0; "3rd Generation Partnership Project; Technical Specification Group Core Network; Restoration procedures (Release 9)"; Sep. 2009 (39 pages).
3GPP TS 23.401 V11.1.0; "3rd Generation Partnership Project; Technical Specification Group Services and System Aspects; General Packet Radio Service (GPRS) enhancements for Evolved Universal Terrestrial Radio Access Network (E-UTRAN) access (Release 11)", Mar. 2012 (284 pages).

(Continued)

*Primary Examiner* — John Pezzlo
(74) *Attorney, Agent, or Firm* — Osha · Liang LLP

(57) ABSTRACT

A mobile communication method according to the present invention includes a step A of releasing, by a gateway device S-GW, a first GBR bearer for a mobile station UE and transmitting "Downlink Data Notification" to a packet exchanger SGSN if a fault of a radio network controller RNC is detected in the state in which a second GBR bearer for the mobile station UE is set, a step B of transmitting, by the packet exchanger SGSN, "Paging" to the mobile station UE, and a step C of starting, by the packet exchanger SGSN, a procedure for releasing the second GBR bearer when no response to the "Paging" is received from the mobile station UE in a predetermined period.

10 Claims, 16 Drawing Sheets

OTHER PUBLICATIONS

3GPP TS 24.301 V11.2.1; "3rd Generation Partnership Project; Technical Specification Group Core Network and Terminals; Non-Access-Stratum (NAS) protocol for Evolved Packet System (EPS); Stage 3 (Release 11)"; Mar. 2012 (327 pages).

3GPP TS 23.007 V11.1.0; "3rd Generation Partnership Project; Technical Specification Group Core Network and Terminals; Restoration procedures (Release 11)"; Mar. 2012 (57 pages).

3GPP TS 23.060 V11.1.0; "3rd Generation Partnership Project; Technical Specification Group Services and System Aspects; General Packet Radio Service (GPRS); Service description; Stage 2 (Release 11)"; Mar. 2012 (332 pages).

3GPP TS 23.401 V9.2.0; "3rd Generation Partnership Project; Technical Specification Group Services and System Aspects; General Packet Radio Service (GPRS) enhancements for Evolved Universal Terrestrial Radio Access Network (E-UTRAN) access (Release 9)", Sep. 2009 (244 pages).

* cited by examiner

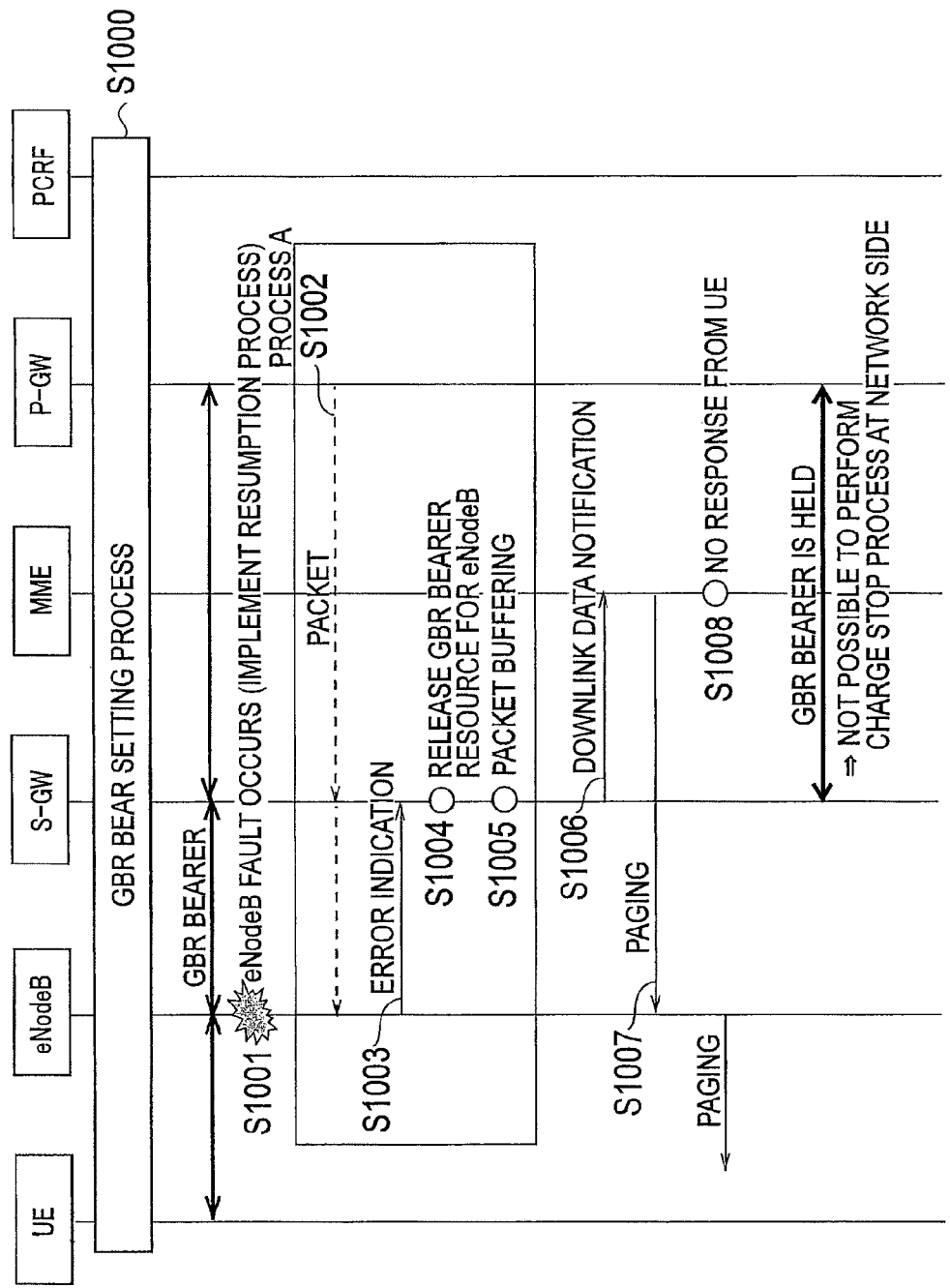

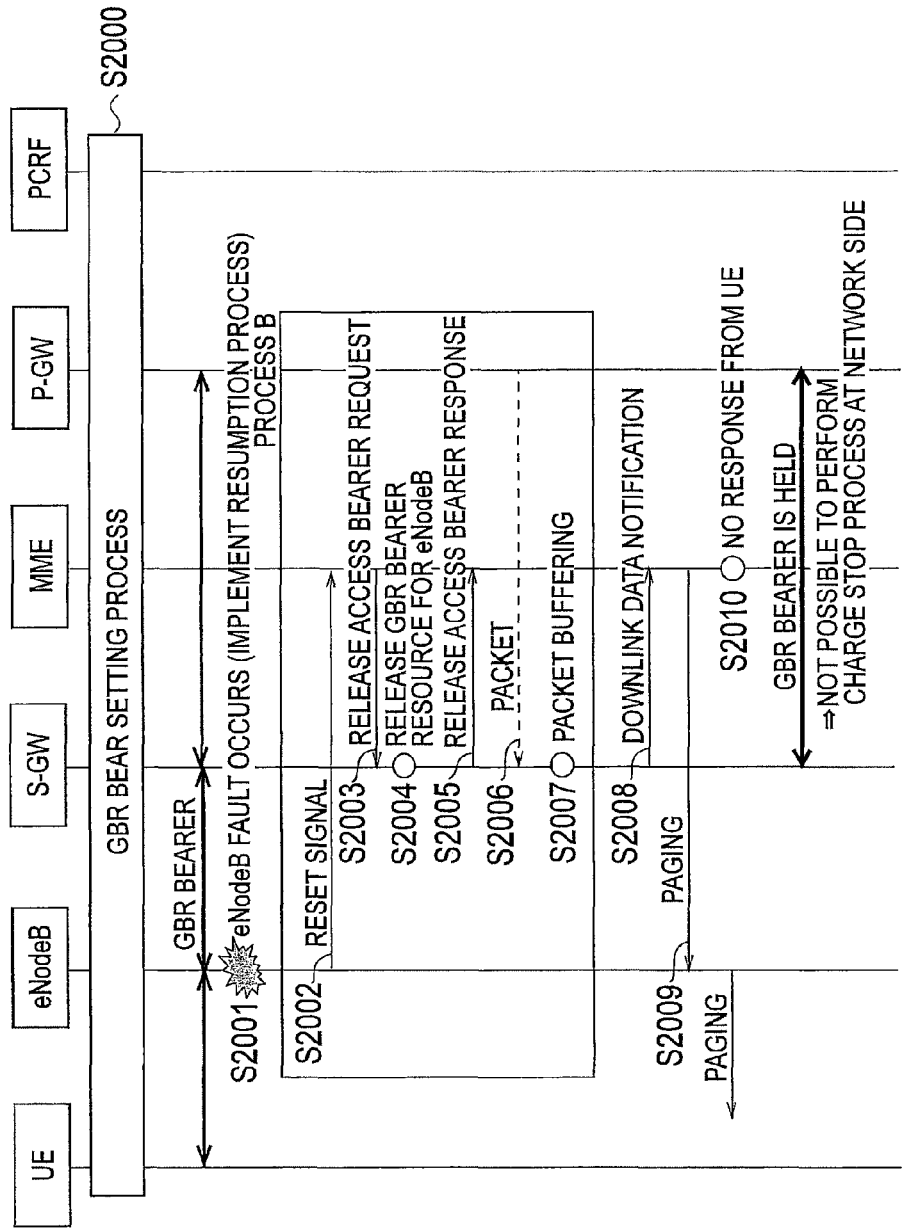

MOBILE COMMUNICATION METHOD, MOBILITY MANAGEMENT NODE, AND PACKET EXCHANGER

TECHNICAL FIELD

The present invention relates to a mobile communication method, a mobility management node, and a packet exchanger.

BACKGROUND ART

With reference to FIG. 15 and FIG. 16, a description will be provided for a control process of a GBR (Guaranteed Bit Rate) bearer when a fault occurs in a radio base station eNodeB in a mobile communication system employing an E-UTRAN (Evolved UTRAN) scheme.

Firstly, with reference to FIG. 15, a first example of the control process of the GBR bearer will be described.

As illustrated in FIG. 15, in step S1000, a GBR bearer setting process is performed, so that a GBR bearer is set between a mobile station UE and a radio base station eNodeB, between the radio base station eNodeB and a gateway device S-GW (Serving Gateway), and between the gateway device S-GW and a gateway device P-GW (PDN Gateway).

In step S1001, a fault occurs in the radio base station eNodeB, and a resumption process is performed.

If a packet addressed to the mobile station UE, which is transferred via the gateway device P-GW and the gateway device S-GW, is received in step S1002, the radio base station eNodeB transmits "Error Indication" to the gateway device S-GW in step S1003.

The gateway device S-GW releases a GBR bearer resource for the radio base station eNodeB in step S1004, and buffers the packet addressed to the mobile station UE, which is received from the gateway device P-GW, in step S1005.

In step S1006, the gateway device S-GW transmits "Downlink Data Notification" for notifying the packet, which is being buffered, addressed to the mobile station UE, to a mobility management node MME (Mobility Management Entity).

In step S1007, the mobility management node MME transmits "Paging" addressed to the mobile station UE to the radio base station eNodeB, and activates a paging timer.

In step S1008, even when there is no response to the "Paging" from the mobile station UE until the paging timer expires, the mobility management node MME holds the GBR bearer between the gateway device S-GW and the gateway device P-GW rather than releasing the GBR bearer.

Secondly, with reference to FIG. 16, a second example of the control process of the GBR bearer will be described.

As illustrated in FIG. 16, in step S2000, a GBR bearer setting process is performed, so that a GBR bearer is set between the mobile station UE and the radio base station eNodeB, between the radio base station eNodeB and the gateway device S-GW, and between the gateway device S-GW and the gateway device P-GW.

In step S2001, a fault occurs in the radio base station eNodeB, and a resumption process is performed.

In step S2002, the radio base station eNodeB transmits a RESET signal to the mobility management node MME.

In step S2003, the mobility management node MME transmits "Release Access Bearer Request" to the gateway device S-GW.

The gateway device S-GW releases a GBR bearer resource for the radio base station eNodeB in step S2004, and transmits "Release Access Bearer Response" to the mobility management node MME in step S2005.

If a packet addressed to the mobile station UE is received from the gateway device P-GW in step S2006, the gateway device S-GW buffers the packet in step S2007.

In step S2008, the gateway device S-GW transmits "Downlink Data Notification" for notifying the packet, which is being buffered, addressed to the mobile station UE, to the mobility management node MME.

In step S2009, the mobility management node MME transmits "Paging" addressed to the mobile station UE to the radio base station eNodeB, and activates a paging timer.

In step S2010, even when there is no response to the "Paging" from the mobile station UE until the paging timer expires, the mobility management node MME holds the GBR bearer between the gateway device S-GW and the gateway device P-GW rather than releasing the GBR bearer.

PRIOR ART DOCUMENT

Non-Patent Document

Non-Patent Document 1: 3GPP TS23.401
Non-Patent Document 2: 3GPP TS24.301
Non-Patent Document 3: 3GPP TS23.007
Non-Patent Document 4: 3GPP TS23.060

However, in the mobile communication system, as illustrated in FIG. 15 and FIG. 16, in the state in which the GBR bearer is set, even when a fault occurs in the radio base station eNodeB, since it is not possible to disconnect the GBR bearer in a core network at an appropriate timing, if a service is provided based on time charging in the GBR bearer, there is a problem that it is not possible to stop the charge.

Furthermore, even in a mobile communication system employing a UTRAN scheme, in the state in which the GBR bearer is set, even when a fault occurs in a radio network controller RNC, since it is not possible to disconnect the GBR bearer in a core network at an appropriate timing, if a service is provided based on time charging in the GBR bearer, there is a problem that it is not possible to stop the charge.

SUMMARY OF THE INVENTION

Therefore, the present invention has been achieved in view of the above-described problems, and an object thereof is to provide a mobile communication method, a mobility management node, and a packet exchanger, by which it is possible to disconnect a GBR bearer in a core network at an appropriate timing when a fault occurs in an apparatus in a radio access network in the state in which the GBR bearer is set.

A first characteristic of the present embodiment is summarized in that a mobile communication method includes: a step A of releasing, by a first gateway device, a first bearer for a mobile station and transmitting downlink data notification for notifying a downlink data signal addressed to the mobile station to a mobility management node, the downlink data signal being buffered, if a fault of a radio base station is detected in the state in which the first bearer for a mobile station is set between the first gateway device and the radio base station and a second bearer for the mobile station is set between the first gateway device and a second gateway device; a step B of transmitting, by the mobility management node, a paging signal to the mobile station; and a step C of starting, by the mobility management node, a procedure for releasing the second bearer when no response to the paging signal is received from the mobile station in a predetermined period.

A second characteristic of the present embodiment is summarized in that a mobile communication method includes: a step of transmitting, by a mobility management node, a bearer release request to a first gateway device and activating a predetermined timer if a fault of a radio base station is detected in the state in which a first bearer for a mobile station is set between the first gateway device and the radio base station and a second bearer for the mobile station is set between the first gateway device and a second gateway device; a step of releasing, by the first gateway device, the first bearer according to the bearer release request; and a step of starting, by the mobility management node, a procedure for releasing the second bearer when no connection request is received from the mobile station before the predetermined timer expires.

A third characteristic of the present embodiment is summarized in that a mobility management node is configured to transmit a paging signal to a mobile station when a first gateway device detects a fault of a radio base station, releases a first bearer for a mobile station, and transmits downlink data notification for notifying a downlink data signal addressed to the mobile station to a mobility management node, the downlink data signal being buffered, in the state in which the first bearer is set between the first gateway device and the radio base station and a second bearer for the mobile station is set between the first gateway device and a second gateway device, and configured to start a procedure for releasing the second bearer when no response to the paging signal is received from the mobile station in a predetermined period.

A fourth characteristic of the present embodiment is summarized in that a mobility management node is configured to transmit a bearer release request to a first gateway device and activate a predetermined timer if a fault of a radio base station is detected in the state in which a first bearer for a mobile station is set between the first gateway device and the radio base station and a second bearer for the mobile station is set between the first gateway device and a second gateway device, and configured to start a procedure for releasing the second bearer when no connection request is received from the mobile station before the predetermined timer expires.

A fifth characteristic of the present embodiment is summarized as a mobile communication method including: a step A of releasing, by a first gateway device, a first bearer for a mobile station and transmitting downlink data notification for notifying a downlink data signal addressed to the mobile station to a packet exchanger, the downlink data signal being buffered, if a fault of a radio network controller is detected in the state in which the first bearer is set between the first gateway device and the radio network controller and a second bearer for the mobile station is set between the first gateway device and a second gateway device; a step B of transmitting, by the packet exchanger, a paging signal to the mobile station; and a step C of starting, by the packet exchanger, a procedure for releasing the second bearer when no response to the paging signal is received from the mobile station in a predetermined period.

A sixth characteristic of the present embodiment is summarized in that a mobile communication method includes: a step of transmitting, by a packet exchanger, a bearer release request to a first gateway device and activating a predetermined timer if a fault of a radio network controller is detected in the state in which a first bearer for a mobile station is set between the first gateway device and the radio network controller and a second bearer for the mobile station is set between the first gateway device and a second gateway device; a step of releasing, by the first gateway device, the first bearer according to the bearer release request; and a step of starting, by the packet exchanger, a procedure for releasing the second bearer when no connection request is received from the mobile station before the predetermined timer expires.

A seventh characteristic of the present embodiment is summarized in that a packet exchanger is configured to transmit a paging signal to a mobile station when a first gateway device detects a fault of a radio network controller, releases a first bearer for a mobile station, and transmits downlink data notification for notifying a downlink data signal addressed to the mobile station to a packet exchanger, the downlink data signal being buffered, in the state in which the first bearer is set between the first gateway device and the radio network controller and a second bearer for the mobile station is set between the first gateway device and a second gateway device, and configured to start a procedure for releasing the second bearer when no response to the paging signal is received from the mobile station in a predetermined period.

An eighth characteristic of the present embodiment is summarized in that a packet exchanger is configured to transmit a bearer release request to a first gateway device and activate a predetermined timer if a fault of a radio network controller is detected in the state in which a first bearer for a mobile station is set between the first gateway device and the radio network controller and a second bearer for the mobile station is set between the first gateway device and a second gateway device, and configured to start a procedure for releasing the second bearer when no connection request is received from the mobile station before the predetermined timer expires.

As described above, according to the present invention, it is possible to provide a mobile communication method, a mobility management node, and a packet exchanger, by which it is possible to disconnect a GBR bearer in a core network at an appropriate timing when a fault occurs in an apparatus in a radio access network in the state in which the GBR bearer is set.

BRIEF DESCRIPTION OF THE DRAWINGS

FIG. 15 is a sequence diagram explaining the operation of a conventional mobile communication system.

FIG. 16 is a sequence diagram explaining the operation of a conventional mobile communication system.

DETAILED DESCRIPTION

Mobile Communication System According to First Embodiment of the Present Invention With reference to FIG. 1 to FIG. 4, a mobile communication system according to a first embodiment of the present invention will be described.

Figure 1:
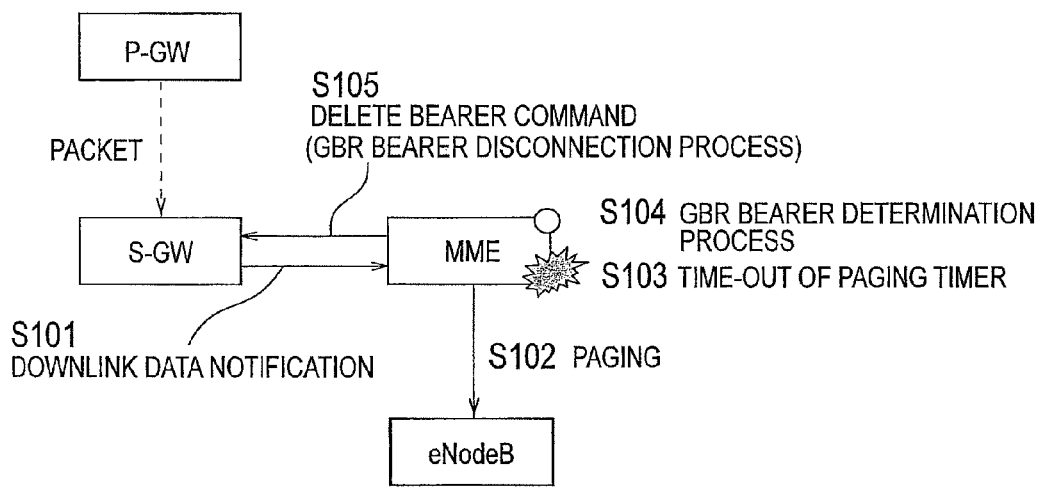
FIG. 1 is a diagram explaining the operation of a mobile communication system according to a first embodiment of the present invention.
Figure 2:
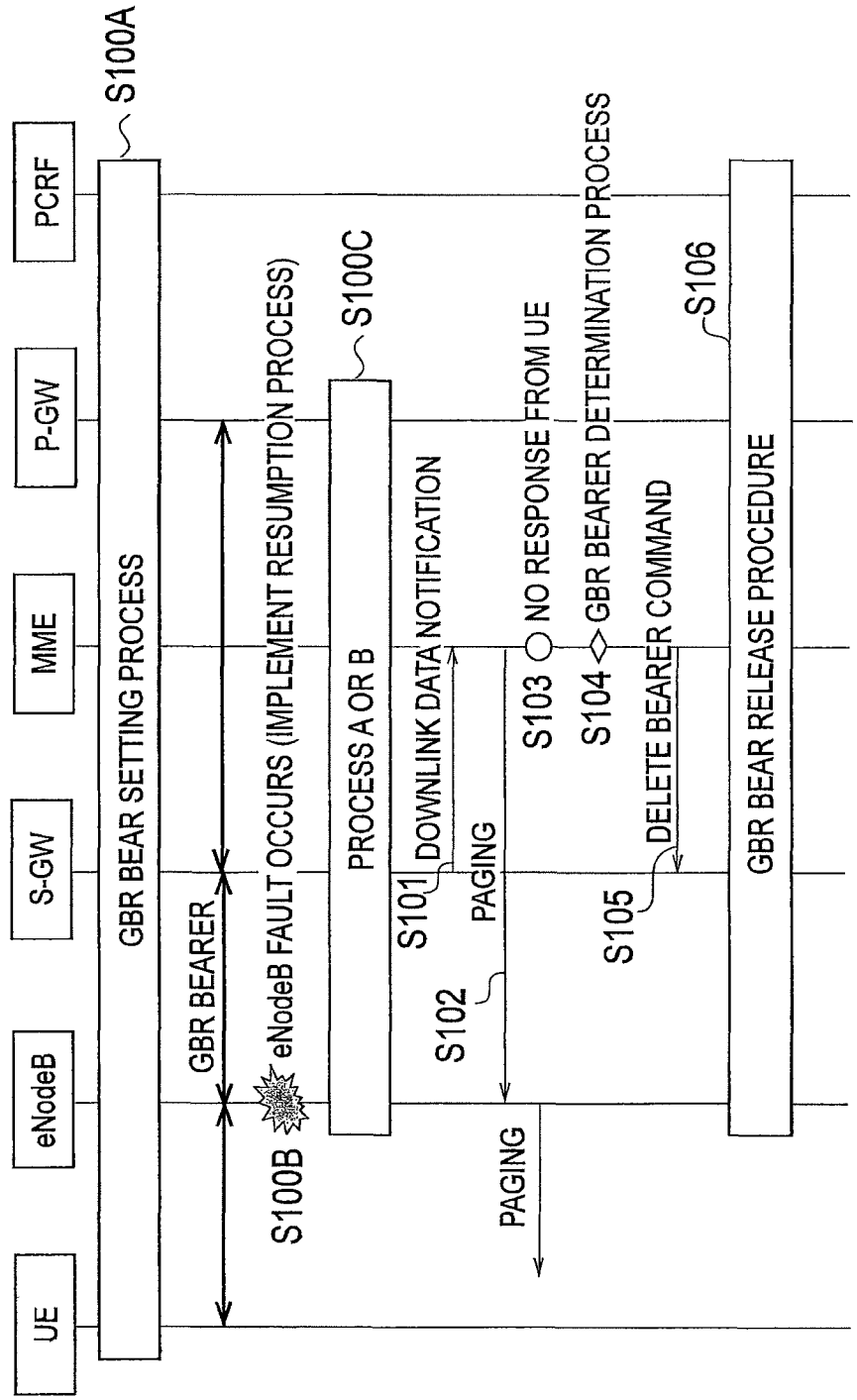
FIG. 2 is a sequence diagram explaining the operation of the mobile communication system according to the first embodiment of the present invention.

The mobile communication system according to the present embodiment is a mobile communication system employing an E-UTRAN scheme, and includes a server device PCRF (Policy and Charge Rule Function), a gateway device P-GW, a gateway device S-GW, a mobility management node MME, and a radio base station eNodeB as illustrated in FIG. 1 and FIG. 2.

Hereinafter, with reference to FIG. 1 to FIG. 4, the operation of the mobile communication system according to the first embodiment of the present invention will be described.

As illustrated in FIG. 1 and FIG. 2, in step S100A of FIG. 2, a GBR bearer setting process is performed, so that a GBR bearer is set between a mobile station UE and the radio base station eNodeB, between the radio base station eNodeB and the gateway device S-GW, and between the gateway device S-GW and the gateway device P-GW. Hereinafter, the GBR bearer between the radio base station eNodeB and the gateway device S-GW will be referred to as "first GBR bearer (first bearer)", and the GBR bearer between the gateway device S-GW and the gateway device P-GW will be referred to as "second GBR bearer (second bearer)".

In step S100B of FIG. 2, a fault occurs in the radio base station eNodeB, and a resumption process is performed. Then, in step S100C of FIG. 2, the process A illustrated in FIG. 15 or the process B illustrated in FIG. 16 is performed.

In step S101, the gateway device S-GW transmits "Downlink Data Notification" for notifying a packet (a downlink data signal), which is being buffered, addressed to the mobile station UE to the mobility management node MME.

In step S102, the mobility management node MME transmits "Paging (paging signal)" addressed to the mobile station UE to the radio base station eNodeB, and activates a paging timer.

Figure 3:
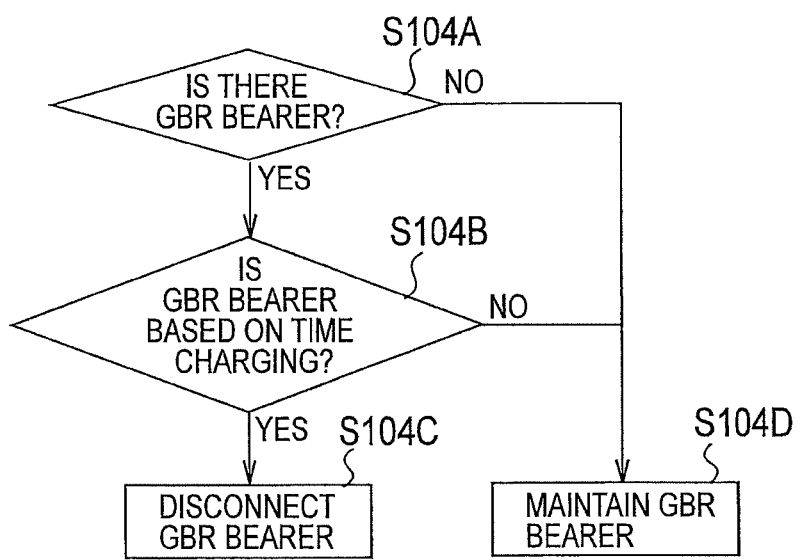
FIG. 3 is a flowchart explaining the operation of the mobile communication system according to the first embodiment of the present invention.

In step S103, when there is no response to the "Paging" from the mobile station UE until the paging timer expires, the mobility management node MME performs a GBR bearer determination process illustrated in FIG. 3 in step S104.

As illustrated in FIG. 3, in step 104A, the mobility management node MME determines whether a second GBR bearer for the mobile station UE exists. In the case of "YES", the present operation proceeds to step S104B. In the case of "NO", the present operation proceeds to step S104D.

In step S104B, the mobility management node MME determines whether the second GBR bearer for the mobile station UE is a bearer through which a service is provided based on time charging. In the case of "YES", the present operation proceeds to step S104C. In the case of "NO", the present operation proceeds to step S104D.

In step S104C, the mobility management node MME starts a procedure after step S105 in which the second GBR bearer for the mobile station UE is released. Meanwhile, in step S104D, the mobility management node MME maintains the second GBR bearer for the mobile station UE rather than releasing the second GBR bearer for the mobile station UE, thereby completing the process. At this time, the mobility management node MME may transmit a signal for requesting resource release toward the radio base station eNodeB to the gateway device S-GW.

In addition, in step S104B, instead of the above-mentioned determination, the mobility management node MME may also determine whether a predetermined QCI (QoS Class Identifier), for example, "QCI=1 (Speech)", is assigned to the second GBR bearer, or determine whether predetermined conditions based on a predetermined operator policy have been satisfied. Here, the QCI denotes information indicating the level of QoS of the second GBR bearer.

When it is decided that the second GBR bearer for the mobile station UE is released in step S104C, the mobility management node MME transmits "Delete Bearer Command" to the gateway device S-GW in step S105.

Figure 4:
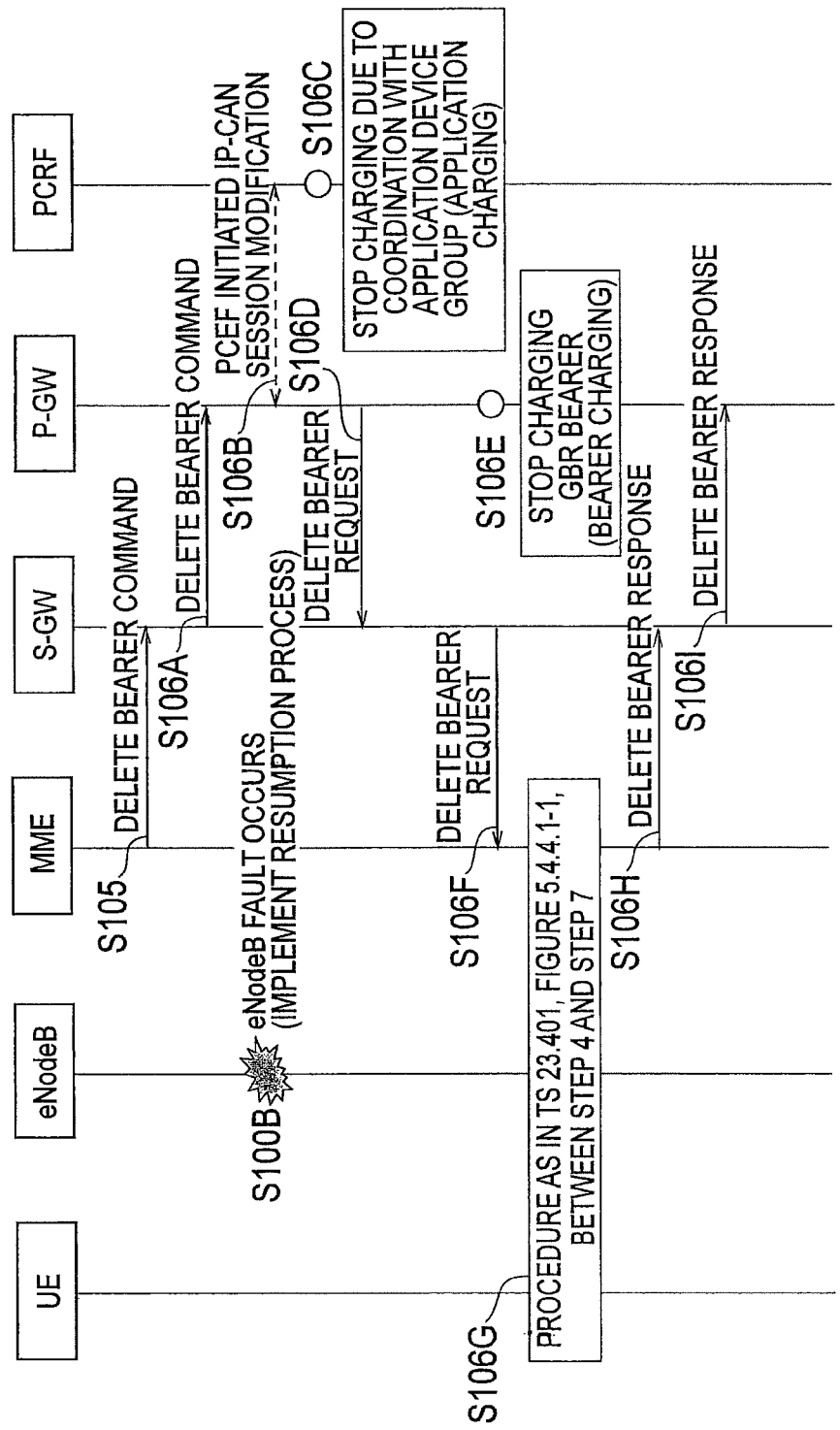
FIG. 4 is a sequence diagram explaining the operation of the mobile communication system according to the first embodiment of the present invention.

In step S106, a GBR bearer release procedure illustrated in FIG. 4 is started, so that the second GBR bearer for the mobile station UE is released.

As illustrated in FIG. 4, if the "Delete Bearer Command" is received, the gateway device S-GW transmits the "Delete Bearer Command" to the gateway device P-GW in step S106A.

In step S106B, when a charging process is performed between the gateway device P-GW and the server device PCRF at an application level, "PCEF Initiated IP-CAN Session Modification" procedure is performed, so that the charging process is stopped.

The gateway device P-GW transmits "Delete Bearer Request" to the gateway device S-GW in step S106D, and stops a charging process for the GBR bearer for the mobile station UE in step S106E.

In step S106F, the gateway device S-GW transmits the "Delete Bearer Request" to the mobility management node MME.

Figure 5:
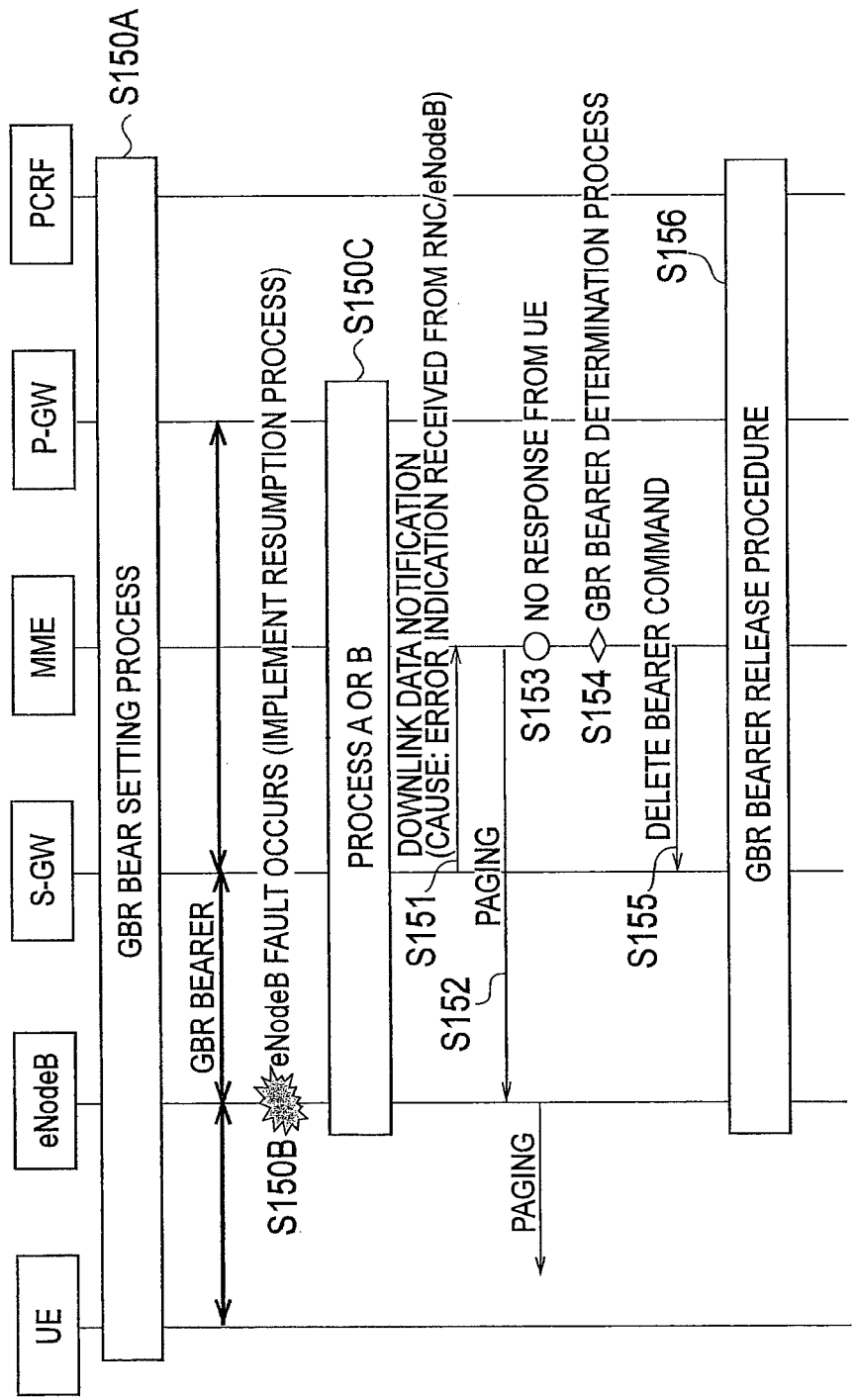
FIG. 5 is a sequence diagram explaining the operation of a mobile communication system according to a first modification of the first embodiment of the present invention.

In step S106G, a procedure shown from step 4 to step 7 of FIG. 5.4.4.1-1 of TS 23.401 defined by the 3GPP is performed.

In step S106H, the mobility management node MME transmits "Delete Bearer Response" to the gateway device S-GW, and in step S106I, the gateway device S-GW transmits the "Delete Bearer Response" to the gateway device P-GW.

In accordance with the mobile communication system according to the first embodiment of the present invention, in the state in which the GBR bearer is set, when a fault occurs in the radio base station eNodeB, it is possible to disconnect the second GBR bearer at an appropriate timing, thereby stopping the charging process related to the second GBR bearer.

First Modification

Figure 6:
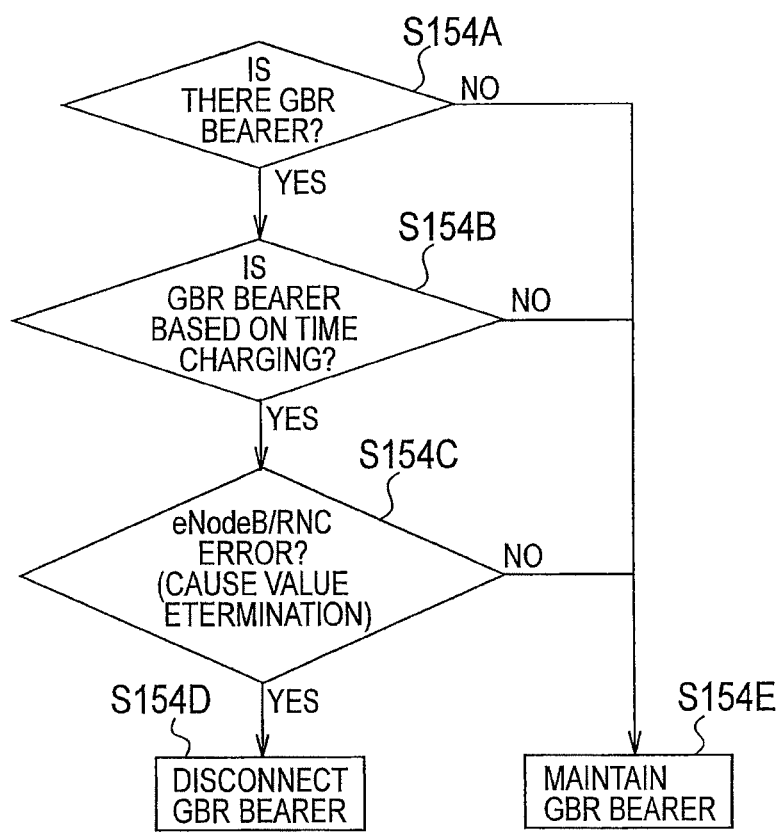
FIG. 6 is a flowchart explaining the operation of the mobile communication system according to the first modification of the first embodiment of the present invention.

With reference to FIG. 5 and FIG. 6, a mobile communication system according to a first modification of the above-mentioned first embodiment will be described. The following is a description of the mobile communication system according to the first modification while focusing on the difference from the mobile communication system according to the first embodiment described above.

As illustrated in FIG. 5, the operations of steps S150A to S150C are the same as those of steps S100A to S100C illustrated in FIG. 2.

In step S151, the gateway device S-GW transmits "Downlink Data Notification" including "Cause: Error Indication received from RNC/eNodeB (predetermined information)" to the mobility management node MME.

In step S152, the mobility management node MME transmits "Paging (paging signal)" addressed to the mobile station UE to the radio base station eNodeB, and activates a paging timer.

In step S153, when there is no response to the "Paging" from the mobile station UE until the paging timer expires, the mobility management node MME performs a GBR bearer determination process illustrated in FIG. 6 in step S154.

As illustrated in FIG. 6, in step S154A, the mobility management node MME determines whether a second GBR bearer for the mobile station UE exists. In the case of "YES", the present operation proceeds to step S154B. In the case of "NO", the present operation proceeds to step S154E.

In step S154B, the mobility management node MME determines whether the second GBR bearer for the mobile station UE is a bearer through which a service is provided based on time charging. In the case of "YES", the present operation proceeds to step S154C. In the case of "NO", the present operation proceeds to step S154E.

In step S154C, the mobility management node MME determines whether the "Cause: Error Indication received from RNC/eNodeB" is included in the received "Downlink Data Notification" and the content of the information element corresponds to a disconnection reason. In the case of "YES", the present operation proceeds to step S154D. In the case of "NO", the present operation proceeds to step S154E.

In step S154D, the mobility management node MME releases the second GBR bearer for the mobile station UE. Meanwhile, in step S154E, the mobility management node MME maintains the second GBR bearer for the mobile station UE rather than releasing the second GBR bearer for the mobile station UE, and then, completes the process. At this time, the mobility management node MME may transmit a signal for requesting resource release toward the radio base station eNodeB to the gateway device S-GW.

In addition, in step S154B, instead of the above-mentioned determination, the mobility management node MME may also determine whether a predetermined QCI, for example, "QCI=1 (Speech)", is assigned to the second GBR bearer, or determine whether predetermined conditions based on a predetermined operator policy have been satisfied.

Furthermore, the mobility management node MME may also be configured not to perform the determination in step S154B.

Moreover, when the "Cause: Error Indication received from RNC/eNodeB" is included in the "Downlink Data Notification" and the content of the information element corresponds to the disconnection reason, the mobility management node MME may also be configured to set a value different from a normal value to the paging timer.

As a consequence, an effect is obtained in which it is possible to reduce the time until the GBR bearer is released.

The operations of steps S155 and S156 are the same as those of steps S105 and S106 illustrated in FIG. 2.

Second Modification

Figure 7:
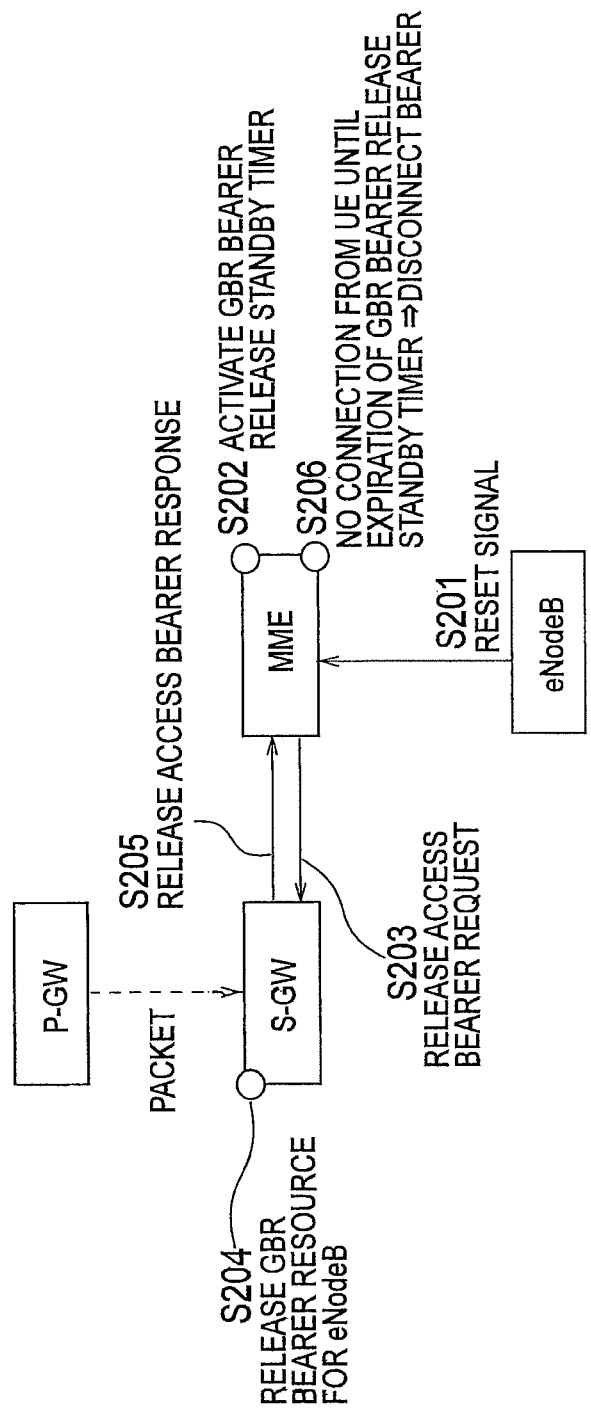
FIG. 7 is a diagram explaining the operation of a mobile communication system according to a second modification of the first embodiment of the present invention.
Figure 8:
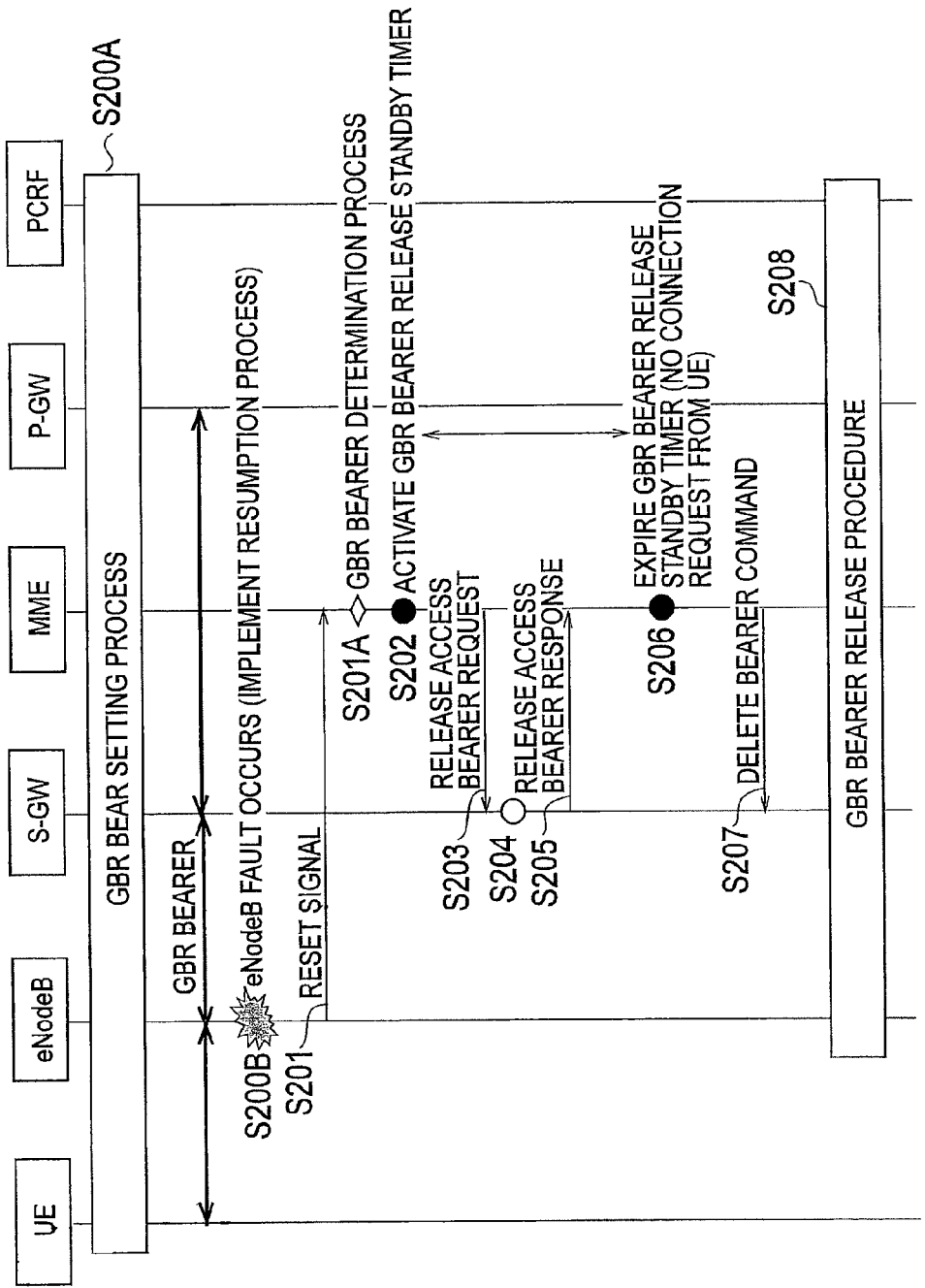
FIG. 8 is a sequence diagram explaining the operation of the mobile communication system according to the second modification of the first embodiment of the present invention.

With reference to FIG. 7 and FIG. 8, a mobile communication system according to a second modification of the above-mentioned first embodiment will be described. The following is a description of the mobile communication system according to the second modification, focusing on the points of difference from the mobile communication system according to the first embodiment described above.

As illustrated in FIG. 8, the operations of steps S200A and S200B are the same as those of steps S100A and S100B illustrated in FIG. 2.

In step S201, the radio base station eNodeB transmits a RESET signal to the mobility management node MME.

When the RESET signal is received, the mobility management node MME may perform the GBR bearer determination process illustrated in FIG. 3 or FIG. 6 in step S201A.

The mobility management node MME activates a GBR bearer release standby timer in step S202, and transmits "Release Access Bearer Request" to the gateway device S-GW in step S203.

The gateway device S-GW releases a GBR bearer resource for the radio base station eNodeB in step S204, and transmits "Release Access Bearer Response" to the mobility management node MME in step S205.

In step S206, when there is no connection request from the mobile station UE until the GBR bearer release standby timer expires, the mobility management node MME transmits "Delete Bearer Command" to the gateway device S-GW in step S207.

In step S208, the GBR bearer release procedure illustrated in FIG. 4 is started, so that the second GBR bearer for the mobile station UE is released.

In accordance with the mobile communication system according to the second modification, even when there is no packet addressed to the mobile station UE, it is possible to disconnect the second GBR bearer at an appropriate timing, thereby stopping the charging process related to the second GBR bearer.

The characteristics of the present embodiment as described above may be expressed as follows.

A first characteristic of the present embodiment is summarized in that a mobile communication method includes: a step A of releasing, by a gateway device S-GW (a first gateway device), a first GBR bearer (a first bearer) for a mobile station UE and transmitting "Downlink Data Notification (downlink data notification)" for notifying a downlink data signal addressed to the mobile station UE to a mobility management node MME, the downlink data signal being buffered, if a fault of a radio base station eNodeB is detected in the state in which the first GBR bearer is set between the gateway device S-GW and the radio base station eNodeB and a second GBR bearer (a second bearer) for the mobile station UE is set between the gateway device S-GW and a gateway device P-GW (a second gateway device); a step B of transmitting, by the mobility management node MME, "Paging (paging signal)" to the mobile station UE; and a step C of starting, by the mobility management node MME, a procedure for releasing the second GBR bearer when no response to the "Paging" is received from the mobile station UE in a period (a predetermined period) defined by a paging timer.

In the first characteristic of the present embodiment, in the step C, when it is determined that the second GBR bearer is a bearer through which a service is provided based on time charging, the mobility management node MME may also further start the procedure for releasing the second GBR bearer.

In the first characteristic of the present embodiment, in the step C, when it is determined that a predetermined QCI (for example, QCI=1) is assigned to the second GBR bearer, the mobility management node MME may also further start the procedure for releasing the second GBR bearer.

In the first characteristic of the present embodiment, in the step C, when it is determined that "Cause: Error Indication received from RNC/eNodeB (predetermined information)" is included in the "Downlink Data Notification" and the content of the information element corresponds to a disconnection reason, the mobility management node MME may also further start the procedure for releasing the second GBR bearer.

In the first characteristic of the present embodiment, in the step A, when "Error Indication (error indication signal)" is received from the radio base station eNodeB, the gateway device S-GW may also detect a fault of the radio base station eNodeB.

A second characteristic of the present embodiment is summarized in that a mobile communication method includes: a step of transmitting, by a mobility management node MME, "Release Access Bearer Request (bearer release request)" to a gateway device S-GW and activating a GBR bearer release standby timer (a predetermined timer) if a fault of a radio base station eNodeB is detected in the state in which a first GBR bearer for a mobile station UE is set between the gateway device S-GW and the radio base station eNodeB and a second GBR bearer for the mobile station UE is set between the gateway device S-GW and a gateway device P-GW; a step of releasing, by the gateway device S-GW, the first GBR bearer according to the "Release Access Bearer Request"; and a step of starting, by the mobility management node MME, a procedure for releasing the second GBR bearer when no connection request is received from the mobile station UE before the GBR bearer release standby timer expires.

A third characteristic of the present embodiment is summarized in that a mobility management node MME is configured to transmit "Paging" to a mobile station UE when a gateway device S-GW detects a fault of a radio base station eNodeB, releases a first GBR bearer for the mobile station UE, and transmits "Downlink Data Notification" to the mobility management node MME in the state in which the first GBR bearer is set between the gateway device S-GW and the radio base station eNodeB and a second GBR bearer for the mobile station UE is set between the gateway device S-GW and a gateway device P-GW, and configured to start a procedure for releasing the second GBR bearer when no response to the "Paging" is received from the mobile station UE in a period defined by a paging timer.

In the third characteristic of the present embodiment, when it is determined that the second GBR bearer is a bearer through which a service is provided based on time charging, the mobility management node MME may also be configured to further start the procedure for releasing the second GBR bearer.

In the third characteristic of the present embodiment, when it is determined that a predetermined QCI is assigned to the second GBR bearer, the mobility management node MME may also be configured to further start the procedure for releasing the second GBR bearer.

In the third characteristic of the present embodiment, when it is determined that "Cause: Error Indication received from RNC/eNodeB" is included in the "Downlink Data Notification" and the content of the information element corresponds to a disconnection reason, the mobility management node MME may also be configured to further start the procedure for releasing the second GBR bearer.

A fourth characteristic of the present embodiment is summarized in that a mobility management node MME is configured to transmit "Release Access Bearer Request" to a gateway device S-GW and activate a GBR bearer release standby timer if a fault of a radio base station eNodeB is detected in the state in which a first GBR bearer for a mobile station UE is set between the gateway device S-GW and the radio base station eNodeB and a second GBR bearer for the mobile station UE is set between the gateway device S-GW and a gateway device P-GW, and configured to start a procedure for releasing the second GBR bearer when no connection request is received from the mobile station UE before the GBR bearer release standby timer expires.

Mobile Communication System According to Second Embodiment of the Present Invention With reference to FIG. 9 and FIG. 10, a mobile communication system according to a second embodiment of the present invention will be described. Hereinafter, the mobile communication system according to the second embodiment of the present invention will be described while focusing on the difference from the mobile communication system according to the first embodiment as described above.

Figure 9:
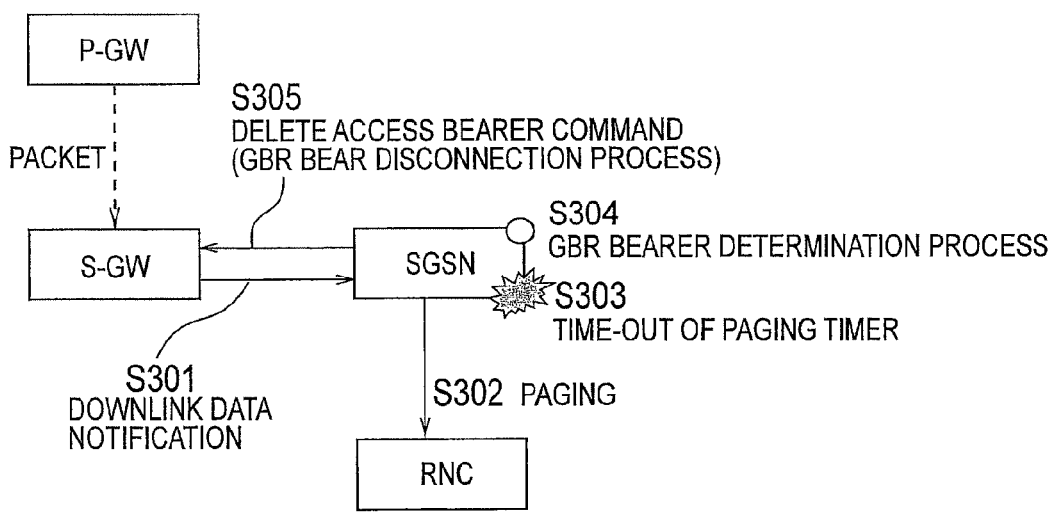
FIG. 9 is a diagram explaining the operation of a mobile communication system according to a second embodiment of the present invention.
Figure 10:
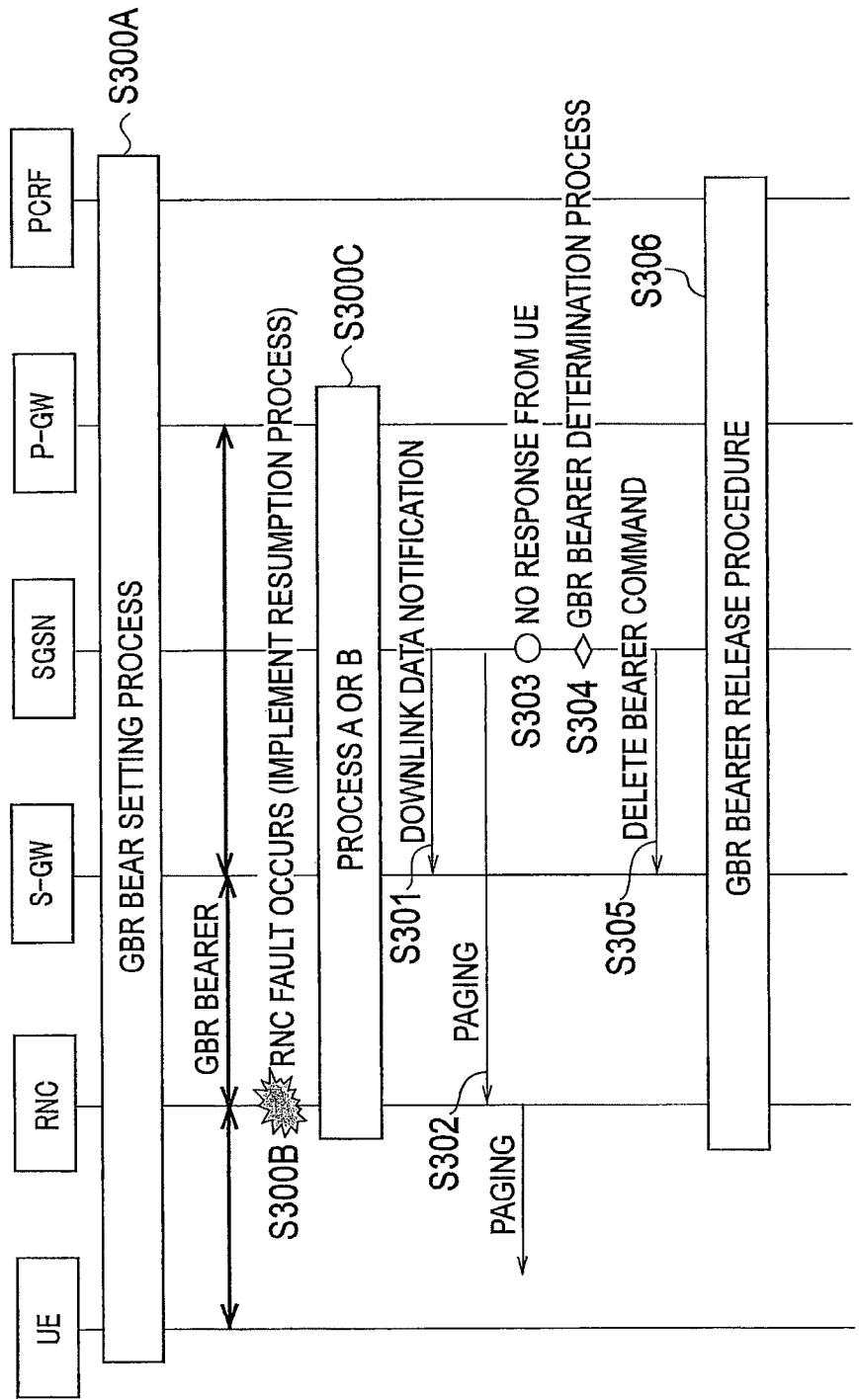
FIG. 10 is a sequence diagram explaining the operation of the mobile communication system according to the second embodiment of the present invention.

The mobile communication system according to the present embodiment is a mobile communication system employing an UTRAN scheme, and includes a server device PCRF, a gateway device P-GW, a gateway device S-GW, a packet exchanger SGSN, and a radio network controller RNC as illustrated in FIG. 9 and FIG. 10.

Hereinafter, with reference to FIG. 9 and FIG. 10, the operation of the mobile communication system according to the second embodiment of the present invention will be described.

As illustrated in FIG. 9 and FIG. 10, in step S300A, a GBR bearer setting process is performed, so that a GBR bearer is set between a mobile station UE and the radio network controller RNC, between the radio network controller RNC and the gateway device S-GW, and between the gateway device S-GW and the gateway device P-GW. Hereinafter, the GBR bearer between the radio network controller RNC and the gateway device S-GW will be referred to as "first GBR bearer (first bearer)", and the GBR bearer between the gateway device S-GW and the gateway device P-GW will be referred to as "second GBR bearer (second bearer)".

In addition, the GBR bearer between the radio network controller RNC and the gateway device S-GW will be referred to as "Direct Tunnel". Furthermore, instead of the "Direct Tunnel", the GBR bearer may also be set between the radio network controller RNC and the packet exchanger SGSN, and between the packet exchanger SGSN and the gateway device S-GW. In this case, the GBR bearer will be referred to as "Non-Direct Tunnel".

In step S300B, a fault occurs in the radio network controller RNC, and a resumption process is performed. Then, in step S300C, the process A illustrated in FIG. 15 or the process B illustrated in FIG. 16 is performed.

In addition, in the second embodiment, the radio base station eNodeB in FIG. 15 and FIG. 16 is regarded as the radio network controller RNC and the mobility management node MME in FIG. 15 and FIG. 16 is regarded as the gateway device S-GW.

In step S301, the gateway device S-GW transmits "Downlink Data Notification" to the packet exchanger SGSN.

In step S302, the packet exchanger SGSN transmits "Paging (paging signal)" addressed to the mobile station UE to the radio network controller RNC, and activates a paging timer.

In step S303, when there is no response to the "Paging" from the mobile station UE until the paging timer expires, the packet exchanger SGSN performs the GBR bearer determination process illustrated in FIG. 3 in step S304.

When it is decided that the second GBR bearer for the mobile station UE is released, the packet exchanger SGSN transmits "Delete Bearer Command" to the gateway device S-GW in step S305.

In step S306, the GBR bearer release procedure illustrated in FIG. 4 is started, so that the second GBR bearer for the mobile station UE is released.

In accordance with the mobile communication system according to the second embodiment of the present invention, in the state in which the GBR bearer is set, when a fault occurs in the radio network controller RNC, it is possible to disconnect the second GBR bearer at an appropriate timing, thereby stopping the charging process related to the second GBR bearer.

First Modification

Figure 11:
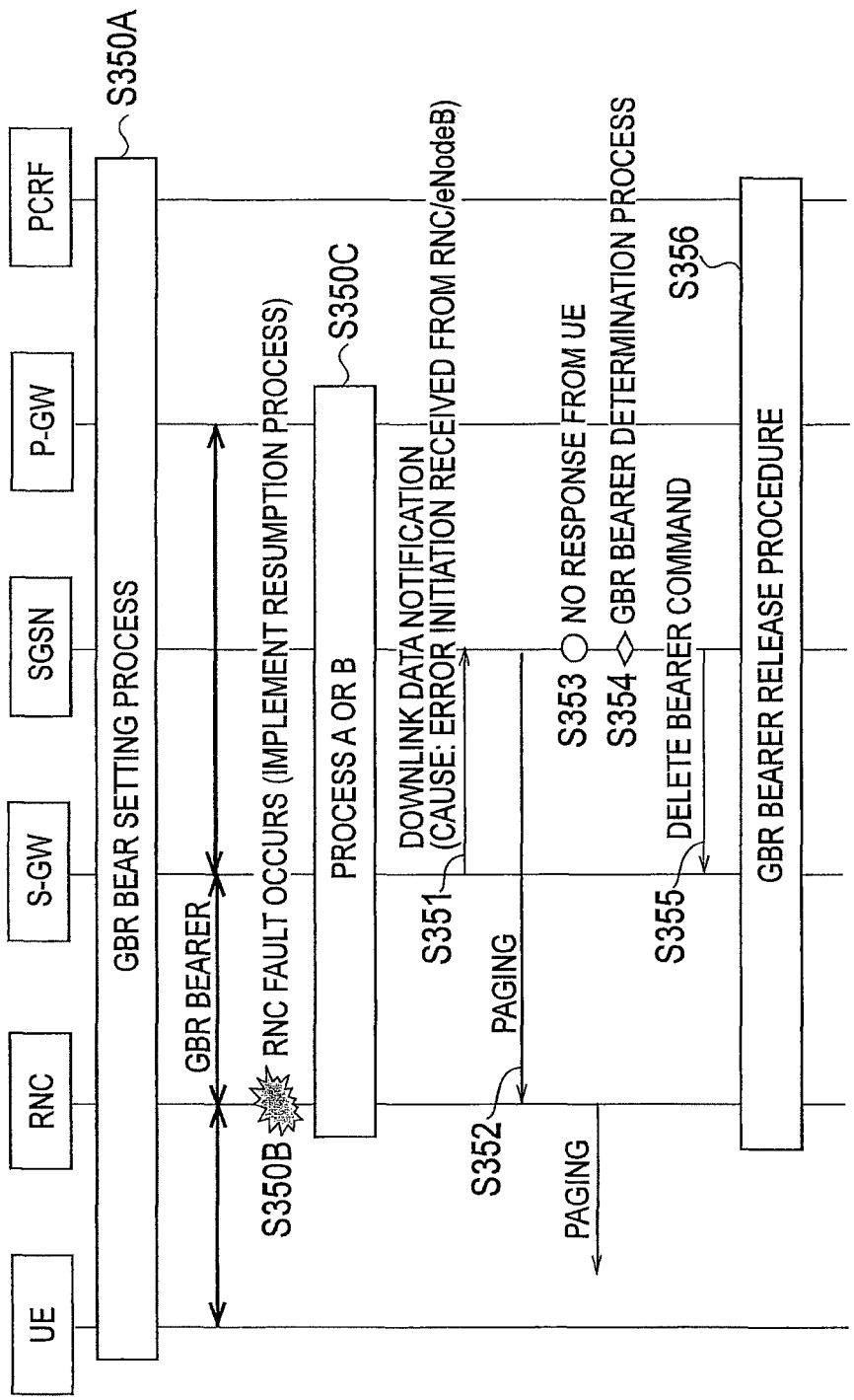
FIG. 11 is a sequence diagram explaining the operation of a mobile communication system according to a first modification of the second embodiment of the present invention.

With reference to FIG. 11, a mobile communication system according to a first modification of the above-mentioned second embodiment will be described. Hereinafter, the mobile communication system according to the present first modification will be described while focusing on the difference from the above-mentioned mobile communication system according to the second embodiment.

As illustrated in FIG. 11, the operations of steps S350A to S350C are the same as those of steps S300A to S300C illustrated in FIG. 10.

In step S351, the gateway device S-GW transmits "Downlink Data Notification" including "Cause: Error Indication received from RNC/eNodeB (predetermined information)" to the packet exchanger SGSN.

In step S352, the packet exchanger SGSN transmits "Paging (paging signal)" addressed to the mobile station UE to the radio network controller RNC, and activates a paging timer.

In step S353, when there is no response to the "Paging" from the mobile station UE until the paging timer expires, the packet exchanger SGSN performs the GBR bearer determination process illustrated in FIG. 6 in step S354.

The operations of steps S355 and S356 are the same as those of steps S305 and S306 illustrated in FIG. 10.

Second Modification

Figure 12:
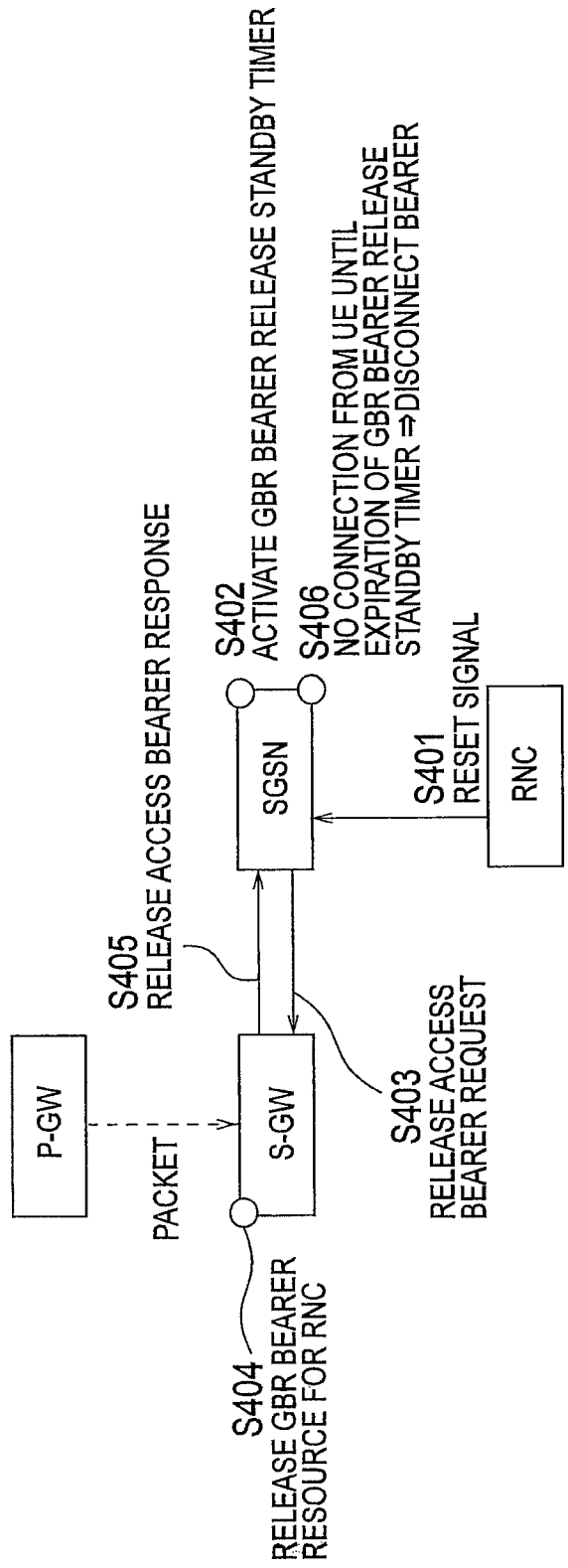
FIG. 12 is a diagram explaining the operation of a mobile communication system according to a second modification of the second embodiment of the present invention.
Figure 13:
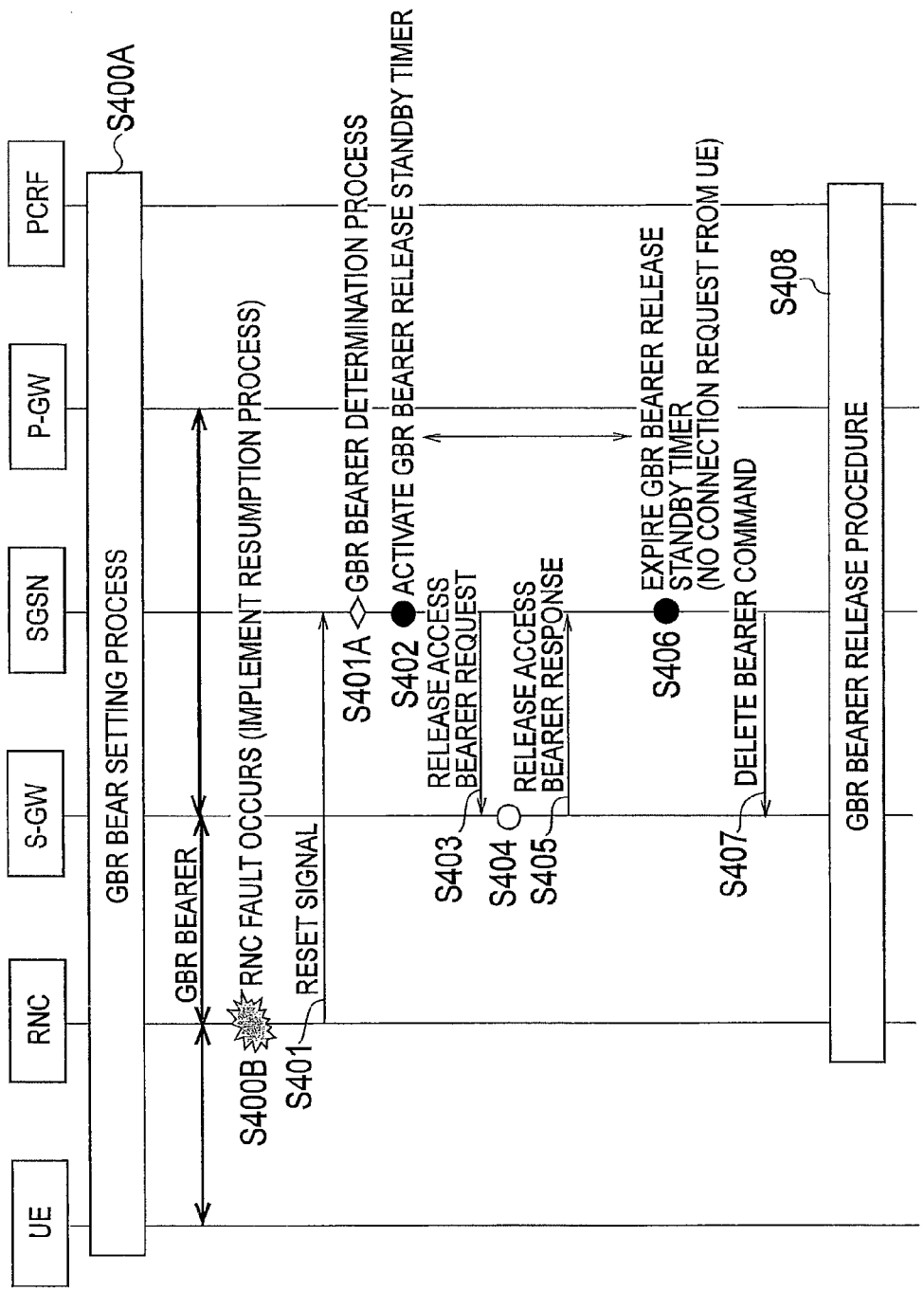
FIG. 13 is a sequence diagram explaining the operation of the mobile communication system according to the second modification of the second embodiment of the present invention.

With reference to FIG. 12 and FIG. 13, a mobile communication system according to a second modification of the above-mentioned second embodiment will be described. Hereinafter, the mobile communication system according to the present second modification will be described while focusing on the difference from the above-mentioned mobile communication system according to the second embodiment.

In the mobile communication system according to the second modification, the "Direct Tunnel" is applied, that is, a packet transferred from the gateway device P-GW to the gateway device S-GW is configured to be transferred to the radio network controller RNC without passing through the packet exchanger SGSN.

As illustrated in FIG. 13, the operations of steps S400A and S400B are the same as those of steps S300A and S300B illustrated in FIG. 10.

In step S401, the radio network controller RNC transmits a RESET signal to the packet exchanger SGSN.

When the RESET signal is received, the packet exchanger SGSN may perform the GBR bearer determination process illustrated in FIG. 3 or FIG. 6 in step S401A.

The packet exchanger SGSN activates a GBR bearer release standby timer in step S402, and transmits "Release Access Bearer Request" to the gateway device S-GW in step S403.

The gateway device S-GW releases a GBR bearer resource for the radio network controller RNC in step S404, and transmits "Release Access Bearer Response" to the packet exchanger SGSN in step S405.

In step S406, when there is no connection request from the mobile station UE until the GBR bearer release standby timer expires, the packet exchanger SGSN transmits "Delete Bearer Command" to the gateway device S-GW in step S407.

In step S408, the GBR bearer release procedure illustrated in FIG. 4 is started, so that the second GBR bearer for the mobile station UE is released.

In addition, in step S401, the packet exchanger SGSN may also be configured to detect a fault in the radio network controller RNC using a method other than the method of receiving the RESET signal from the radio network controller RNC.

For example, the packet exchanger SGSN may also be configured to detect a fault in the radio network controller RNC using an RANAP signal process and the like.

Third Modification

Figure 14:
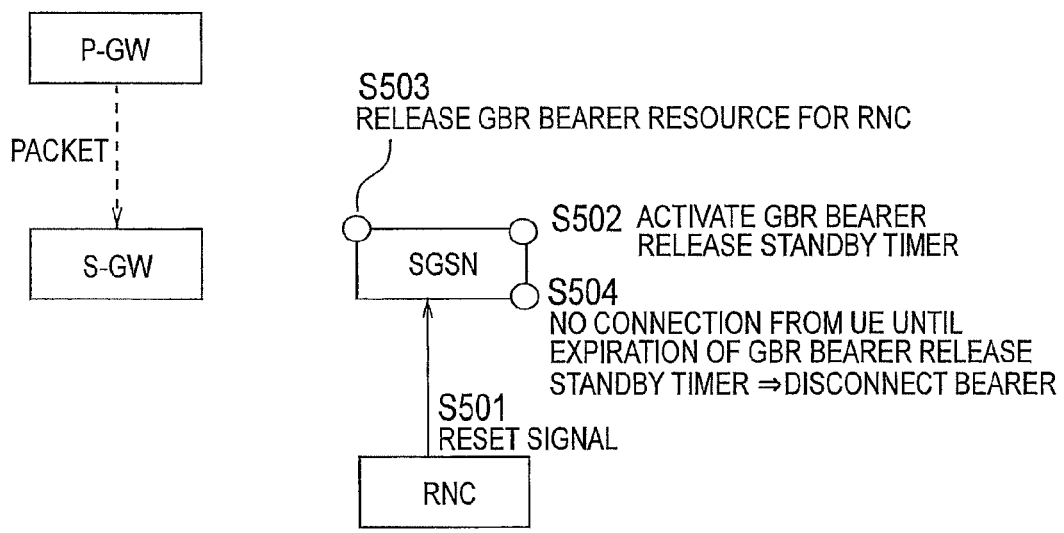
FIG. 14 is a diagram explaining the operation of a mobile communication system according to a third modification of the second embodiment of the present invention.

With reference to FIG. 14, a mobile communication system according to a third modification of the above-mentioned second embodiment will be described. The following is a description of the mobile communication system according to the third modification, focusing on the points of difference from the mobile communication system according to the second embodiment described above.

In the mobile communication system according to the third modification, the "Non-Direct Tunnel" is applied, that is, a packet transferred from the gateway device P-GW to the gateway device S-GW is configured to be transferred to the radio network controller RNC through the packet exchanger SGSN.

The operations of steps S400A and S400B illustrated in FIG. 13 are performed, and then the radio network controller RNC transmits a RESET signal to the packet exchanger SGSN in step S501.

When the RESET signal is received, the packet exchanger SGSN may perform the GBR bearer determination process illustrated in FIG. 3 or FIG. 6.

The packet exchanger SGSN activates a GBR bearer release standby timer in step S502, and releases a GBR bearer resource for the radio network controller RNC in step S503.

In step S504, when there is no connection request from the mobile station UE until the GBR bearer release standby timer expires, the packet exchanger SGSN starts the GBR bearer release procedure illustrated in FIG. 4, thereby releasing the second GBR bearer for the mobile station UE.

The characteristics of the present embodiment as described above may be expressed as follows.

A first characteristic of the present embodiment is summarized in that a mobile communication method includes: a step A of releasing, by a gateway device S-GW (or a packet exchanger SGSN), a first GBR bearer for a mobile station UE and transmitting "Downlink Data Notification" to a packet exchanger SGSN if a fault of a radio network controller RNC is detected in the state in which the first GBR bearer is set between the gateway device S-GW and the radio network controller RNC or between the radio network controller RNC and the packet exchanger SGSN, and between the packet exchanger SGSN and the gateway device S-GW, and a second GBR bearer for the mobile station UE is set between the gateway device S-GW and a gateway device P-GW; a step B of transmitting, by the packet exchanger SGSN, "Paging" to the mobile station UE; and a step C of starting, by the packet exchanger SGSN, a procedure for releasing the second GBR bearer when no response to the "Paging" is received from the mobile station UE in a period defined by a paging timer.

In the first characteristic of the present embodiment, in the step C, when it is determined that the second GBR bearer is a bearer through which a service is provided based on time charging, the packet exchanger SGSN may also further start the procedure for releasing the second GBR bearer.

In the first characteristic of the present embodiment, in the step C, when it is determined that a predetermined QCI (for example, QCI=1) is assigned to the second GBR bearer, the packet exchanger SGSN may also further start the procedure for releasing the second GBR bearer.

In the first characteristic of the present embodiment, in the step C, when it is determined that "Cause: Error Indication received from RNC/eNodeB" is included in the "Downlink Data Notification" and the content of the information element corresponds to a disconnection reason, the packet exchanger SGSN may also further start the procedure for releasing the second GBR bearer.

In the first characteristic of the present embodiment, in the step A, when "Error Indication" is received from the radio network controller RNC, the gateway device S-GW may also detect a fault of the radio network controller RNC.

A second characteristic of the present embodiment is summarized in that a mobile communication method includes: a step of transmitting, by a packet exchanger SGSN, "Release Access Bearer Request" to a gateway device S-GW and activating a GBR bearer release standby timer if a fault of a radio base station eNodeB is detected in the state in which a first GBR bearer for a mobile station UE is set between the gateway device S-GW and a radio network controller RNC and a second GBR bearer for the mobile station UE is set between the gateway device S-GW and a gateway device P-GW; a step of releasing, by the gateway device S-GW, the first GBR bearer according to the "Release Access Bearer Request"; and a step of starting, by the packet exchanger SGSN, a procedure for releasing the second GBR bearer when no connection request is received from the mobile station UE before the GBR bearer release standby timer expires.

A third characteristic of the present embodiment is summarized in that a packet exchanger SGSN is configured to transmit "Paging" to a mobile station UE when a gateway device S-GW detects a fault of a radio network controller RNC, releases a first GBR bearer for the mobile station UE, and transmits "Downlink Data Notification" to the packet exchanger SGSN in the state in which the first GBR bearer is set between the gateway device S-GW and the radio network controller RNC and a second GBR bearer for the mobile station UE is set between the gateway device S-GW and a gateway device P-GW, and configured to start a procedure for releasing the second GBR bearer when no response to the "Paging" is received from the mobile station UE in a period defined by a paging timer.

In the third characteristic of the present embodiment, when it is determined that the second GBR bearer is a bearer through which a service is provided based on time charging, the mobility management node MME may also be configured to further start the procedure for releasing the second GBR bearer.

In the third characteristic of the present embodiment, when it is determined that a predetermined QCI is assigned to the second GBR bearer, the mobility management node MME may also be configured to further start the procedure for releasing the second GBR bearer.

In the third characteristic of the present embodiment, when it is determined that "Cause: Error Indication received from RNC/eNodeB" is included in the "Downlink Data Notification" and the content of the information element corresponds to a disconnection reason, the mobility management node MME may also be configured to further start the procedure for releasing the second GBR bearer.

A fourth characteristic of the present embodiment is summarized in that a packet exchanger SGSN is configured to transmit "Release Access Bearer Request" to a gateway device S-GW and activate a GBR bearer release standby timer if a fault of a radio network controller RNC is detected in the state in which a first GBR bearer for a mobile station UE is set between the gateway device S-GW and the radio network controller RNC and a second GBR bearer for the mobile station UE is set between the gateway device S-GW and a gateway device P-GW, and configured to start a procedure for releasing the second GBR bearer when no connection request is received from the mobile station UE before the GBR bearer release standby timer expires.

In addition, the operation of the above-mentioned the mobile station UE, radio base station eNodeB, the mobility management node MME, the gateway device S-GW, the gateway device P-GW, the packet exchanger SGSN or the radio network controller RNC may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such a storage medium is connected to the processor so that the processor can write and read information into and from the storage medium. Such a storage medium may also be accumulated in the processor. Such storage medium and processor may be arranged in an ASIC. Such ASIC may be arranged in the mobile station UE, radio base station eNodeB, the mobility management node MME, the gateway device S-GW, the gateway device P-GW, the packet exchanger SGSN or the radio network controller RNC. As a discrete component, such storage medium and processor may be arranged in the mobile station UE, radio base station eNodeB, the mobility management node MME, the gateway device S-GW, the gateway device P-GW, the packet exchanger SGSN or the radio network controller RNC.

Thus, the present invention has been specifically explained by using the above-mentioned embodiments; however, it is obvious that for persons skilled in the art, the present invention is not limited to the embodiments explained herein. The present invention can be implemented as corrected and modified modes without departing from the gist and the scope of the present invention defined by the claims. Therefore, the description of the specification is intended for explaining the example only and does not impose any limited meaning to the present invention.

The invention claimed is:

1. A mobile communication method, comprising:
   a step A of transmitting, by a mobility management node, a bearer release request to a first gateway device if an error indication signal is received from a radio base station in the state in which a first bearer for a mobile station is set between the first gateway device and the radio base station and a second bearer for the mobile station is set between the first gateway device and a second gateway device;
   a step B of releasing, by the first gateway device, the first bearer according to the bearer release request; and
   a step C of starting, by the mobile management node, a procedure for releasing the second bearer.

2. The mobile communication method according to claim 1, wherein, in the step C, when it is determined that the second bearer is a bearer through which a service is provided based on time charging, the mobility management node further starts the procedure for releasing the second bearer.

3. The mobile communication method according to claim 1, wherein, in the step C, when it is determined that a predetermined QCI is assigned to the second bearer, the mobility management node further starts the procedure for releasing the second bearer.

4. The mobile communication method according to claim 1, wherein, in the step C, when the second bearer is a GBR bearer, the mobility management node further starts the procedure for releasing the second bearer.

5. A mobile management node, wherein the mobile management node is configured to transmit a bearer release request to a first gateway device and start a procedure for releasing a second bearer if an error indication signal is received from a radio base station in the state in which a first bearer for a mobile station is set between the first gateway device and the radio base station and a second bearer for the mobile station is set between the first gateway device and a second gateway device.

6. A mobile communication method, comprising:
   a step A of transmitting, by a packet exchanger, a bearer release request to a first gateway device if an error indication signal is received from a radio network controller in the state in which a first bearer for a mobile station is set between the first gateway device and the radio network controller and a second bearer for the mobile station is set between the first gateway device and a second gateway device;
   a step B of releasing, by the first gateway device, the first bearer according to the bearer release request; and
   a step C of starting, by the packet exchanger, a procedure for releasing the second bearer.

7. The mobile communication method according to claim 6, wherein, in the step C, when it is determined that the second bearer is a bearer through which a service is provided based on time charging, the packet exchanger further starts the procedure for releasing the second bearer.

8. The mobile communication method according to claim 6, wherein, in the step C, when it is determined that a predetermined QCI is assigned to the second bearer, the packet exchanger further starts the procedure for releasing the second bearer.

9. The mobile communication method according to claim 6, wherein, in the step C, when the second bearer is a GBR bearer, the packet exchanger further starts the procedure for releasing the second bearer.

10. A packet exchanger, wherein the packet exchanger is configured to transmit a bearer release request to a first gateway device and start a procedure for releasing a second bearer if an error indication signal is received from a radio network controller in the state in which a first bearer for a mobile station is set between the first gateway device and the radio network controller and a second bearer for the mobile station is set between the first gateway device and a second gateway device.

* * * * *